US010339220B2

(12) United States Patent
Harari et al.

(10) Patent No.: US 10,339,220 B2
(45) Date of Patent: Jul. 2, 2019

(54) MONITORING CONVERSATIONS TO IDENTIFY TOPICS OF INTEREST

(71) Applicant: Oath Inc., Dulles, VA (US)

(72) Inventors: Ron Harari, Petach-Tiva (IL); Ronen Artman (Arad), Rockville, MD (US)

(73) Assignee: Oath Inc., Dulles, VA (US)

( * ) Notice: Subject to any disclaimer, the term of this patent is extended or adjusted under 35 U.S.C. 154(b) by 0 days.

(21) Appl. No.: 15/200,297

(22) Filed: Jul. 1, 2016

(65) Prior Publication Data

US 2016/0314112 A1 Oct. 27, 2016

Related U.S. Application Data

(63) Continuation of application No. 12/124,104, filed on May 20, 2008, now Pat. No. 9,384,186.

(51) Int. Cl.
*G06F 17/27* (2006.01)
*H04L 12/58* (2006.01)
*G06Q 30/02* (2012.01)

(52) U.S. Cl.
CPC ...... *G06F 17/2765* (2013.01); *G06F 17/2705* (2013.01); *H04L 51/16* (2013.01); *H04L 51/32* (2013.01); *G06Q 30/0251* (2013.01)

(58) Field of Classification Search
CPC .... G06Q 50/01; G06Q 30/02; G06Q 30/0202; G06Q 30/0251; G06Q 30/0269; G06Q 30/0201; G06Q 30/0255; G06Q 30/0241; G06Q 10/0637; H04M 3/4878; H04L 51/16; H04L 67/22; H04L 51/32; H04L 67/20; H04L 67/306; H04L 43/10; H04L 67/02; H04L 65/403; G06F 17/3053;

(Continued)

(56) References Cited

U.S. PATENT DOCUMENTS

| 6,539,375 B2 | 3/2003 | Kawasaki |
| 7,249,123 B2 | 7/2007 | Elder et al. |

(Continued)

FOREIGN PATENT DOCUMENTS

WO  WO 2009133991 A1 * 11/2009 ............ G06Q 30/02

OTHER PUBLICATIONS

Vincent Toubiana, Arvind Narayanan, Dan Boneh, Helen Nissenbaum, and Solon Barocas, Adnostic: Privacy preserving targeted advertising. In 17th Annual Network & Distributed System Security Symposium, San Diego, CA , USA, Mar. 2010.

(Continued)

*Primary Examiner* — Michael Ortiz-Sanchez
(74) *Attorney, Agent, or Firm* — Bookoff McAndrews, PLLC

(57) ABSTRACT

A system and method for monitoring conversations of a community of users to identify topics of interest is provided. A user community which is based partly on social networking connections relative to a first user is identified. Conversations involving at least one member of the identified user community are monitored. Based in part on an aggregated analysis of the monitored conversations, keywords are selected to present to the first user. The first user is then provided with a display in which the selected keywords associated with the user community are presented to the first user such that the first user can select a keyword to access content associated therewith.

18 Claims, 9 Drawing Sheets

(58) Field of Classification Search
CPC ......... G06F 17/30867; G06F 17/30539; G06F 17/3097; G06F 17/2705; G06F 17/2765; G06F 17/2785; G06F 17/30958; G06F 17/24; G06F 17/274; G06F 17/277; G06F 17/2775; G06F 17/30; G06F 17/30554; G06F 17/30575; G06F 17/30634; G06F 17/30684; G06F 17/30705; G06F 17/30899; G06F 17/30988; G06F 3/0482; G06F 3/0484

See application file for complete search history.

(56) References Cited

U.S. PATENT DOCUMENTS

| | | | |
|---|---|---|---|
| 7,506,263 | B1 | 3/2009 | Johnston et al. |
| 7,546,295 | B2* | 6/2009 | Brave ............... G06F 17/30867 |
| 7,548,915 | B2 | 6/2009 | Ramer et al. |
| 7,730,010 | B2 | 6/2010 | Kishore et al. |
| 7,991,764 | B2 | 8/2011 | Rathod |
| 8,302,030 | B2 | 10/2012 | Soroca et al. |
| 2001/0011264 | A1* | 8/2001 | Kawasaki ......... G06F 17/30867 |
| 2002/0018076 | A1 | 2/2002 | Gianola |
| 2002/0124253 | A1 | 9/2002 | Eyer et al. |
| 2002/0161764 | A1 | 10/2002 | Sharo |
| 2005/0108001 | A1* | 5/2005 | Aarskog ............... G06F 17/271 704/10 |
| 2006/0074863 | A1 | 4/2006 | Kishore et al. |
| 2006/0129455 | A1 | 6/2006 | Shah |
| 2006/0224938 | A1 | 10/2006 | Fikes et al. |
| 2007/0214097 | A1 | 9/2007 | Parsons et al. |
| 2007/0260520 | A1 | 11/2007 | Jha et al. |
| 2007/0299933 | A1* | 12/2007 | Moon ................... G06Q 30/02 709/218 |
| 2008/0103907 | A1 | 5/2008 | Maislos et al. |
| 2008/0104225 | A1* | 5/2008 | Zhang ..................... H04L 67/36 709/224 |
| 2008/0147487 | A1 | 6/2008 | Hirshberg |
| 2008/0294624 | A1 | 11/2008 | Kanigsberg |
| 2008/0300964 | A1 | 12/2008 | Raghunandan |
| 2009/0048928 | A1 | 2/2009 | Gross |
| 2009/0089372 | A1 | 4/2009 | Sacco |
| 2009/0119173 | A1 | 5/2009 | Parsons |
| 2009/0234708 | A1 | 9/2009 | Heiser et al. |
| 2009/0240564 | A1 | 9/2009 | Boerries et al. |
| 2009/0292526 | A1 | 11/2009 | Harari et al. |
| 2010/0223341 | A1 | 9/2010 | Manolescu et al. |
| 2011/0066507 | A1 | 3/2011 | Lyer et al. |
| 2011/0179116 | A1* | 7/2011 | Solomon ............... G06Q 30/02 709/204 |
| 2011/0246910 | A1 | 10/2011 | Moxley et al. |
| 2011/0264531 | A1 | 10/2011 | Bhatia et al. |
| 2012/0179972 | A1* | 7/2012 | Hacid ............... G06F 17/30899 715/738 |

OTHER PUBLICATIONS

P. Kazienko and M. Adamski, AdROSA Aadaptice personalization of web advertising, Information Sciences, 177(11): 2269-2295, 2007.

M. Langheinrich, A. Nakamura, N. Abe, T. Kamba, Y. Koseki Unintrusive customization techniques for Web advertising Computer Networks, 31 (11-16) (1999), pp. 1259-1272.

* cited by examiner

ANNA'S CONVERSATION

310

312

314

ANNA: I WAS RIDING MY BIKE TODAY AND LISTENING TO THE RADIO. I HEARD THAT THERE IS A PEARL JAM CONCERT IN SEATTLE. I LOVE PEARL JAM. THEIR CONCERTS ARE SO GOOD. DO YOU WANT TO GO?

SUBMIT

☐ JULIE
☐ TODD
☐ CORY
☐ TOM

306

USER FREQUENCY VECTOR

| USER ID: ANNA B | MESSAGE TERM: PEARL JAM | MESSAGE TERM: BIKE | TERM FREQUENCY: PEARL JAM = 2 | TERM FREQUENCY: BIKE = 1 | DATE: 4/16/08 |
|---|---|---|---|---|---|
| 402 | 404 | 406 | 408 | 410 | 412 |

MONITORING CONVERSATIONS TO IDENTIFY TOPICS OF INTEREST

This application is a continuation of and claims the benefit of priority to U.S. patent application Ser. No. 12/124,104, filed May 20, 2008 (now allowed). The disclosure of the above-referenced application is expressly incorporated herein by reference in its entirety.

BACKGROUND

Generally described, computing devices and communication networks can be utilized to exchange information. In a common application, a user at a personal computing device can communicate with another user at another personal computing device via a communication network. For example, a first user at a personal computing device can utilize a messaging application to send a message to a second user at a second personal computing device via a server computing device over the Internet. The first user can also commonly establish a list of contacts to create a community of users which are associated with the first user by a first degree of separation, or a first level. In such embodiments, the user computing device can be referred to as a client computing device and the server computing device can be referred to as a messaging service provider, while the overall environment is commonly referred to as a communications or social networking environment.

In one specific example, an instant messaging service provider provides users with a client side application that allows one user to communicate with another user over a network in real time. An instant messaging display interface is presented to each user and enables users to establish relationships with other users (e.g., "buddy lists") and to engage in chats with other users. The exchange of information between users in a chat is often referred to as a thread and is dynamically generated.

SUMMARY

As with other social networking environments, the instant messaging environment does not provide users with feedback as to what an individual user or groups of user have historically discussed. If available, such information could be used in a variety of ways to suggests topics of interest to users. Accordingly, a system and method for monitoring conversations of a community of users to identify topics of interest is provided.

A messaging service provider having a plurality of users identifies at least one community associated with a first user. The members of the at least one community are identified based partly on social networking connections associated with the first user. The messaging service provider also monitors conversations of each of its users to identify keywords that correspond to topics of interest for each user. Accordingly, the messaging service provider can analyze the collection of monitored conversations associated with each user of a particular identified community. A variety of methodologies and algorithms can be used to parse, or otherwise analyze, such conversations. For example, latent semantic indexing may be used to identify words or phrases as keywords. Similarly, a variety of methodologies and algorithms can be used to identify community-level keywords for a community of users based on the analysis of individual conversations. For example, frequency vectors can be leveraged to weight keywords and/or identify frequently used keywords to determine community-level keywords associated with members of a particular community in a user's social network.

Based in part on the aggregated analysis of the monitored conversations, the messaging service provider can then present community-level keywords to the first user. Each of these community-level keywords can be selectable by the first user to access content associated therewith. In one embodiment, the community-level keywords are presented to the first user adjacent to an instant messaging conversation in order to generate interest in the topics identified by the keywords. In other embodiments, the community-level keywords can be presented to the first user on the user's public user profile page, the user's daily home landing page, and the like.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is one illustrative embodiment of a client messaging display for generating a communication to another user;

FIG. 4 is one illustrative embodiment of a user frequency vector;

DETAILED DESCRIPTION

Generally described, the present disclosure is directed to monitoring conversations of a community of users to identify topics of interest. Specifically, aspects of the disclosure will be described with regard to monitoring conversations involving one or more users in a community associated with a first user and selecting keywords from the monitored conversations for delivery to a client computing device of the first user. Further aspects of the disclosure are directed to causing the first user to be presented with a display in which each of the keywords is selectable to access content associated with the respective keyword. Although various aspects of the disclosure will be described with regard to illustrative examples and embodiments, one skilled in the art will appreciate that the disclosed embodiments and examples should not be construed as limiting.

Figure 1:
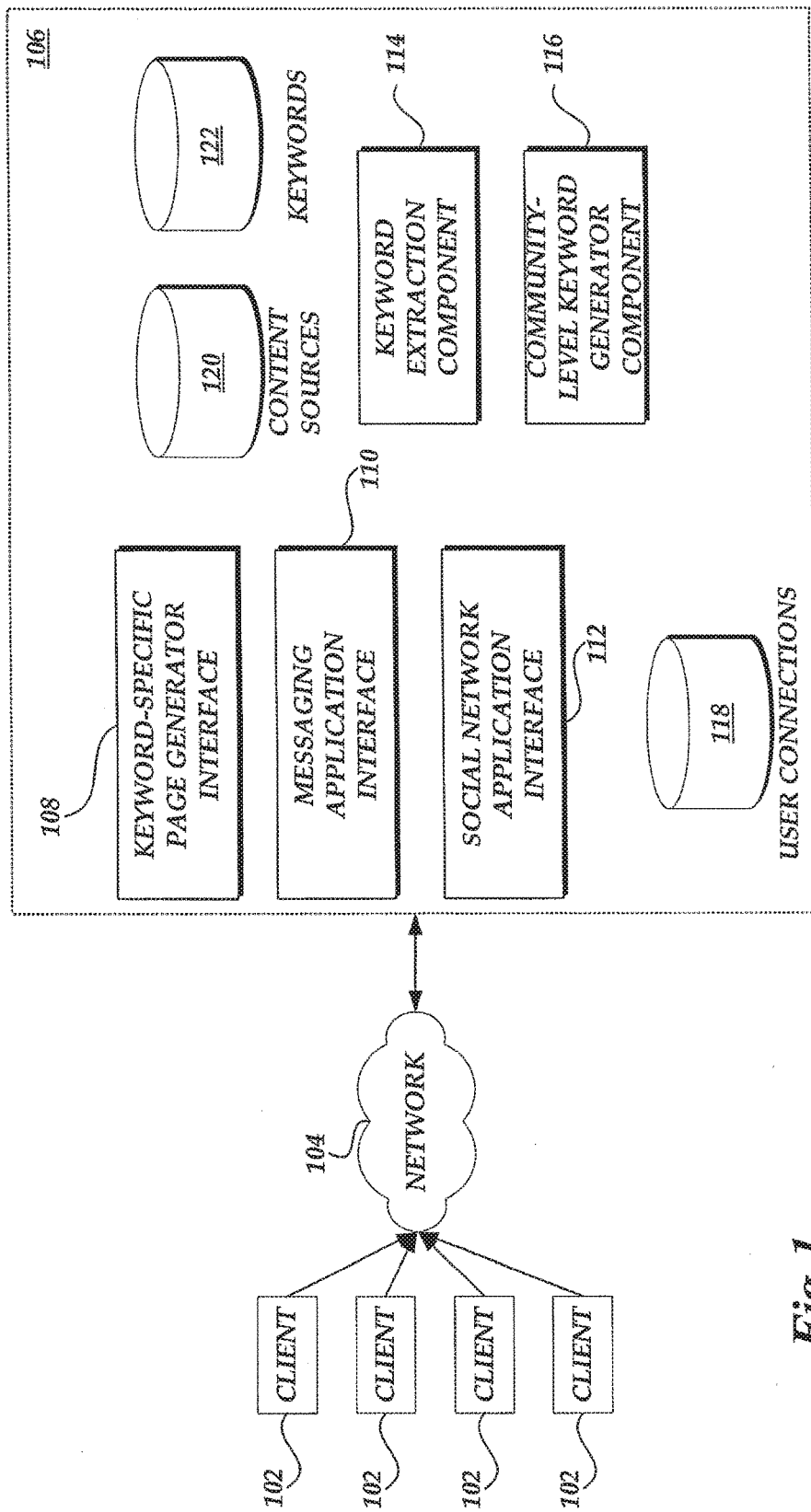
FIG. 1 is a block diagram illustrative of a communications environment including a number of client computing devices, a messaging service provider, and a network over which communications are transmitted.

FIG. 1 is a block diagram illustrative of a communications environment 100 for the processing and monitoring of user messaging content. As illustrated in FIG. 1, the communications environment 100 includes a number of client computing devices 102 (generally referred to as clients) for engaging in communications with other client computing devices. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 104, such as a wide area network or local area network. For example, the client computing devices 102 may be equipped with networking equipment and browser software applications that facilitate communications via the Internet or an intranet.

Although not illustrated in FIG. 1, each client computing device 102 can also include a client side messaging component for facilitating communications between client computing devices 102 over the network 104. Such a client side messaging component can include, for example, an instant messaging application and/or an e-mail application. Such applications can be stand-alone applications or can include executable code that runs in a platform such as a browser.

The communications environment 100 can also include a messaging service provider 106 in communication with the one or more client computing devices 102 via the communication network 104. The messaging service provider 106 illustrated in FIG. 1 corresponds to a logical association of one or more computing devices associated with a messaging service provider. Specifically, the messaging service provider 106 can include a messaging application interface 110 corresponding to one or more server computing devices for obtaining and processing communications from client computing devices 102. The messaging service provider 106 can further include a social networking application interface 112 corresponding to one or more computing devices for establishing and maintaining connections between users of the client computing devices 102 and for processing requests to identify such connections. The user connections can be maintained by a user connection storage component 118. In addition, other user profile data may be maintained by the user connection storage component 118 or by a separate storage component (not shown).

The messaging service provider 106 can yet further include a keyword extraction component 114 and an associated keyword storage component 122, as well as a community-level keyword generator component 116, collectively for determining keywords based on communications received from client computing devices for particular user communities. The user communities are based in part on social networking connections of users of the client computing devices 102. A keyword-specific page generator interface 108 and associated content storage component 120 can further be included at the messaging service provider 106 for providing content to users upon selection of an identified keyword.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

Figure 2:
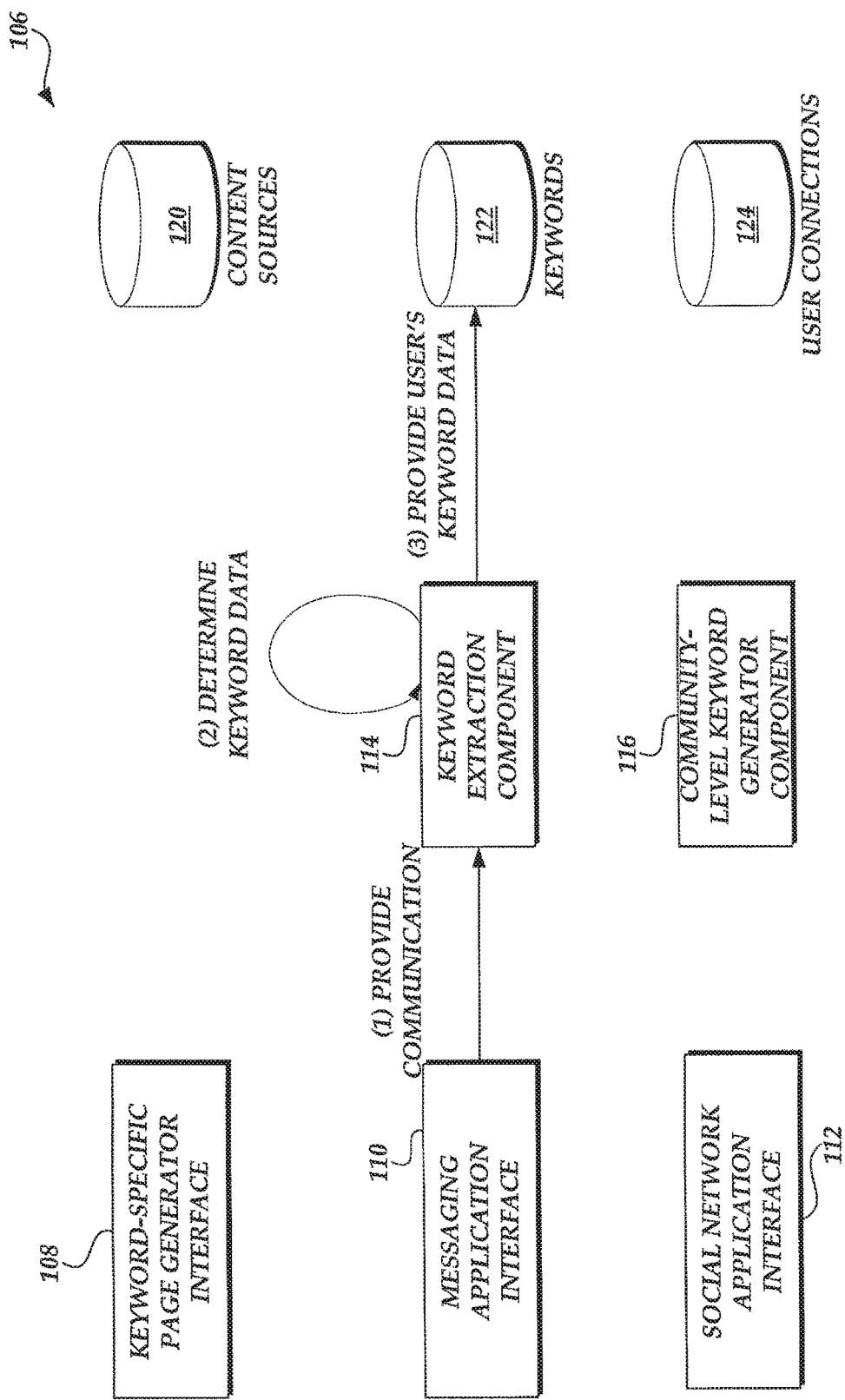
FIG. 2 is a block diagram of the communications environment of FIG. 1 illustrating the generation and processing of a message directed from a client computing device to a messaging service provider.
Figure 5:
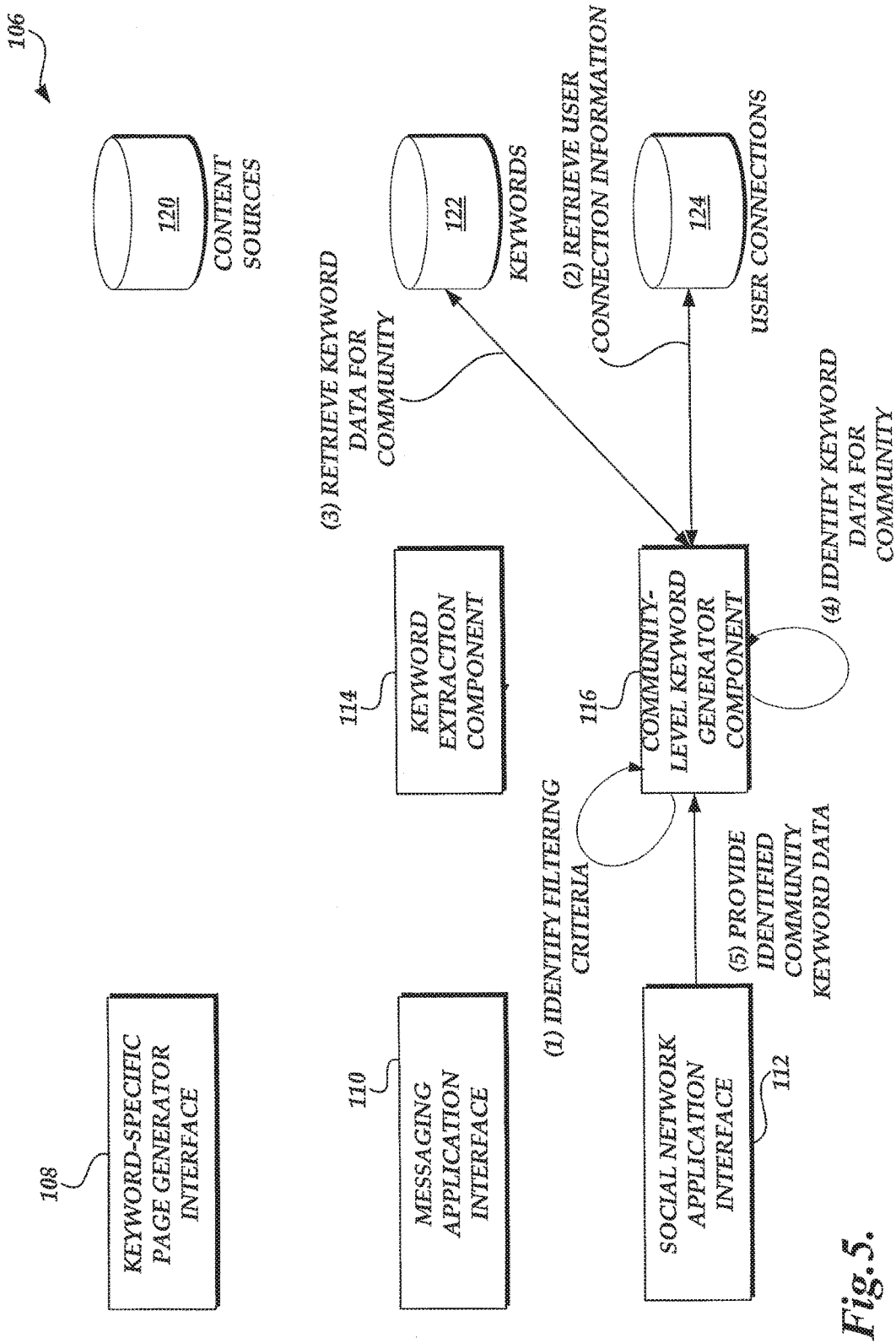
FIG. 5 is a block diagram of the communications environment of FIG. 1 illustrating the determination of community-level keyword data for a user.
Figure 9:
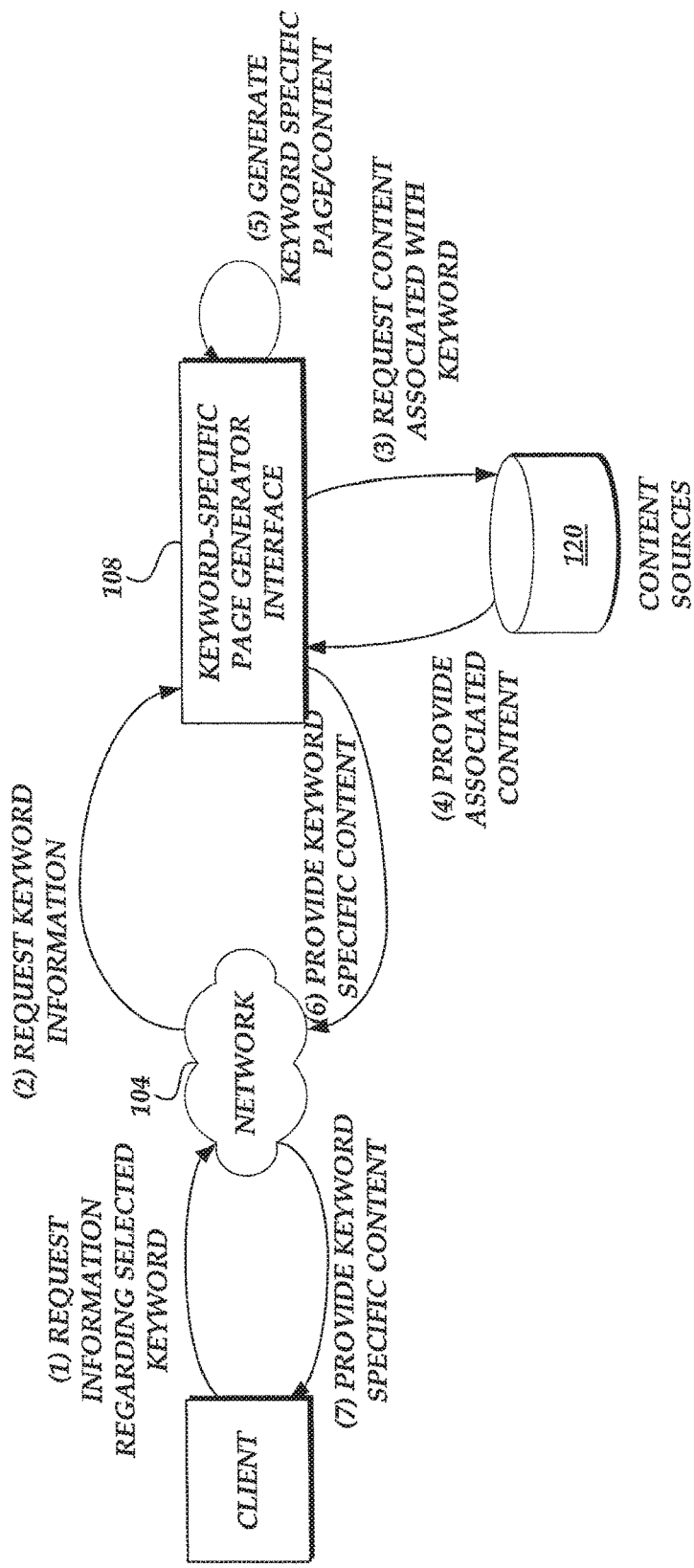
FIG. 9 is a block diagram of the communications environment of FIG. 1 illustrating one embodiment of processing a request for content associated with a selected keyword from a client computing device.

With reference to FIGS. 2, 5 and 9, the interaction between various components of the communications environment 100 of FIG. 1 will be illustrated. For purposes of the examples, however, the illustrations have been simplified such that many of the components utilized to facilitate communications are not shown. One skilled in the relevant art will appreciate that such components can be utilized and that additional interactions would accordingly occur without departing from the spirit and scope of the present disclosure.

With reference now to FIG. 2, a messaging service provider 106 processes a communication transmitted and received from a client computing device 102. The communication can be a message from a first user associated with a first client computing device intended for another user associated with another client computing device, such as an email message, an instant message, a text message, and the like. Such communications, or conversations, can further be addressed to one or more recipients. FIG. 3 illustrates one embodiment of a display screen 300 presented to a first user on a first client computing device 102 for composing an instant message to another user.

Returning to FIG. 2, in one embodiment, a messaging application interface 110 initially receives a communication from a client computing device 102 (not shown) and provides the communication to the keyword extraction component 114. In general, the keyword extraction component 114 identifies one or more keywords from the client communication and provides the identified keywords, together with an association with a particular user, to a keyword storage component 122. More specifically, the keyword extraction component 114 parses the content of the communication to identify relevant keywords used in the communication. Keywords can include a single term or a phrase including multiple terms. For example, in reference to FIG. 3, the terms "Pearl Jam" and "bike" may be identified as keywords directly from the message content of Anna's communication. However, it will be appreciated by one skilled in the relevant art and others that the keywords determined by the keyword extraction component 114 may be based on the communication such that the keywords are directly or indirectly determined from the communication. For example, in further reference to FIG. 3, the terms "concert" and "concerts" can be identified, but the keyword extraction component 114 may determine that the singular version is going to be a keyword.

In another embodiment, the keyword extraction component 114 can use additional information to determine keywords based on the client communications. In this illustrative embodiment, culturally relevant data, for example, can be obtained from news feeds, closed captioning feeds, and the like and compared with the client communication to determine relevant keywords.

One skilled in the relevant art will appreciate that any various methodologies or algorithms may be utilized to determine keyword data based on client communications within the spirit and scope of the present disclosure. The following additional examples will be provided for further illustrative purposes.

In one specific embodiment, where keywords are to be selected with the purpose of identifying topics of interest to a user, an algorithm that monitors the number of times a word or phrase is used in select communications can be used. The algorithm can also mask out terms, such as verbs, prepositions, and the like, from selection from one or more client communications. In other embodiments, a variety of statistical analyses or weighting algorithms for determining keywords can be used. In a further specific embodiment, latent semantic indexing may be used to identify keywords that are, for example, unique or more likely to be of interest to users.

In yet another embodiment, a frequency vector can be used to identify and store keyword data. FIG. 4 depicts an illustrative embodiment of a frequency vector 400 which is associated with Anna's conversation illustrated in the instant message display screen 300 shown in FIG. 3. A frequency vector is an n-dimensional vector (i.e., collection) of features or data extracted from raw data, such as Anna's communication, for further processing. A frequency vector can include one or more parameters in order to label the input, find the input later, and/or determine if the input is related to something else. For example, in reference to the instant message communication depicted in FIG. 3, the keywords identified in Anna's communication may include "Pearl Jam" and "bike." In accordance with this example, the frequency vector 400 shown in FIG. 4 in turn includes a user identifier 402 (e.g., Anna), message terms 404 and 406 identified in the communication (e.g., "Pearl Jam" and "bike"), frequency indicators 408 and 410 (e.g., 2 for "Pearl Jam" and 1 for "bike"), and a date 412 on which the vector was created or updated (e.g., 4/16/08). Additionally, it will be appreciated by those skilled in the relevant art that the frequency vector can include other parameters which can be used to determine or which identify the social relevancy of the identified keywords.

It will further be appreciated by those skilled in the relevant art and others that the messaging application interface 110 can dynamically provide communications received from client computing devices 102 to the keyword extraction component 114 for processing. The process of providing the communications to extract, or otherwise, obtain the keyword data, can be automatic or event driven. For example, a client application may be configured to send communications based on time, after a threshold number of communications or upon a reaching a threshold amount of data. Likewise, the keyword extraction component 114 may collect incoming communications and process the collected communication data in a batch process.

With continued reference to FIG. 2, after the keyword data is identified, the keyword extraction component 114 provides the identified keyword data to the keyword storage component 122 for storage and for later sharing with the community-level keyword generator component 116, as will be described in further detail below. It will be appreciated by one of relevant skill in the art and others that one or more storage components, provided locally and/or remotely, can be utilized for this purpose.

In another embodiment, the identified keyword data for each user can be stored as a part of the user's profile data and subsequently used in a number of contexts, such as recommendations or personalizations.

In reference now to FIG. 5, the messaging service provider 106 determines community-level keyword data for a user. In an illustrative embodiment, the community-level keyword generator component 116 identifies a first set of criteria for determining a first user community associated with a first user. In one embodiment, the first set of criteria is based on first-level connections, or contacts, of the first user. In this embodiment, the community-level keyword generator component 116 then retrieves such user connection information associated with the first user from the user connection storage component 124 to determine members of the first user community.

Once members of the first user community are identified, the community-level keyword generator component 116 retrieves keyword data for each of the members of the first user community from the keyword storage component 122. The community-level keyword generator component 116 then analyzes the received keyword data for all members of the first user community to determine keyword data specific to that community.

It will be appreciated by one skilled in the relevant art that a variety of methodologies or algorithms may be implemented to determine community-level keyword data based on the keyword data identified for each of the members of the first user community. In one specific example, as similarly set forth above, an algorithm that monitors the number of times a keyword has been used collectively by members of the first user community can be utilized. In other embodiments, a variety of statistical analyses or weighting algorithms for determining the community-level keywords can be used. For example, more weight can be given to keywords identified based on more recent conversations involving members of the first user community. In another example, more weight can be given to keywords identified based on conversations between two members of the first user community. In yet another example, more weight can be given to keywords that have been previously presented to and were selected by users of the particular community. In another specific embodiment, latent semantic indexing may be used to identify community-level keywords that are, for example, more unique or more likely to be of interest to users.

In yet another embodiment, the community-level keyword generator component 116 can use additional information beyond that retrieved from keyword storage component 122 to determine community-level keywords. For example, culturally relevant data can be obtained from news fees, closed captioning feeds, and the like and compared with the retrieved keywords of members of the first user community.

In still another embodiment, the community-level keyword generator component 116 may identify community-level keywords that distinguish the first user community from other user communities. This can be accomplished, for example, by identifying keywords that appear significantly more frequently in the first user community than in other communities.

In a still further embodiment, the community-level keyword generator component 116 can translate keywords to map between different languages such that community-level keywords can be generated for a community including members conversing in a variety of languages, for example a global network.

With continued reference to FIG. 5, after determining community-level keyword data for the first user community, the community-level keyword generator component 116 provides the determined keyword data for the first user community to the social networking application interface 112. In turn, the social networking application interface 112 provides the keyword data for the first user community to the client computing device 102 of the first user over the network 104 (not shown). In one embodiment, the social networking application interface 112 causes the first user to be presented with a display in which each of the keywords is selectable to access content associated with the respective keyword.

In addition or alternatively, in another embodiment, the community-level keyword generator component 116 or the social networking application interface 112 can use the determined community-level keyword data to further determine one or more targeted advertisements to present to the first user. Accordingly, in this example, advertisements which are considered to be relevant to the first user are caused to be displayed to the first user.

In yet another embodiment, the community-level keyword generator component 116 or the social networking application interface 112 can use the determined community-level keyword data to additionally or alternatively determine pre-established communities or groups of users to recommend to the first user to join. In this example, a pre-established community can be identified based on a comparison of the community-level keyword data for the first user community and information defining the pre-established community. For example, if members of the first user community have recently been conversing about bikes, information about a pre-established cycling community group can be presented to the first user. Alternatively, a pre-established community can also be identified based on a comparison of the community-level keyword data for the first user community and community-level keyword data determined for the pre-established community. Such a comparison can, for example, involve identifying the frequency of keywords appearing in common between the communities. In any of these embodiments, information about the pre-established community is thereafter caused to be presented to the first user. This information can include an identifier which is selectable by the first user to join the pre-established community; community-level keywords of the pre-established community which are selectable to access content associated with the respective keyword; and the like.

It will be appreciated by those skilled in the relevant art and others that the messaging application interface 110 and the social network application interface 112 may be combined into a single interface/processing component. Additionally, in another embodiment, a messaging application interface can alternatively provide the community-level keyword data to client computing devices 102. Accordingly, while the messaging application interface 110 and the social network application interface 112 are illustrated as separate components of the messaging service provider 106, such a combination is illustrative in nature and should not be construed as limiting.

In another illustrative embodiment, the above-identified functions of the community-level keyword generator component 116 may be repeated to identify keyword data for a second community associated with the first user. In particular, the community-level keyword generator component 116 can identify a second set of criteria for determining a second user community associated with the first user. It will be appreciated by those skilled in the art and others that a number of criteria may be used. For example, the second set of criteria may be based on second-level connections, or contacts, of the first user. As another example, the second set of criteria may be based on profile data of the first user. In this embodiment, a second user community may include all users located in the same geographic region as the first user. In yet a further embodiment, the second user community may be based on relationships defined in the user's profile. For example, a parent may be provided with the keywords corresponding to a child's communications and/or communications involving the child. In another example, an employer may be provided with keywords from employees' communications. This process may be further repeated for identifying keyword data for yet further communities associated with the first user.

Figure 6:
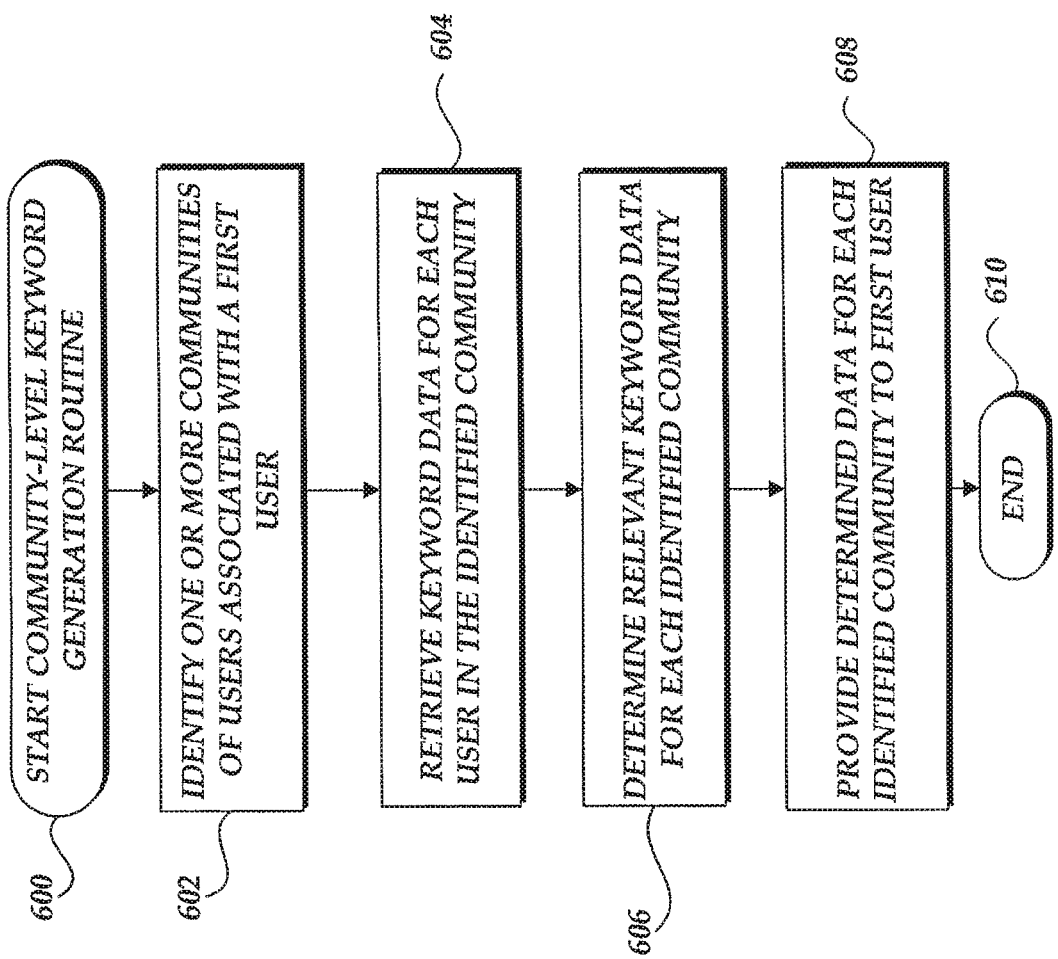
FIG. 6 is a flow diagram illustrative of a community-level keyword generation routine implemented by the messaging service provider for generating keywords for a user community associated with a first user.

With reference now to FIG. 6, one embodiment of a community-level keyword generation routine 600 implemented by the messaging service provider 106 for generating a set of keyword data for a first user community associated with a first user will be described. One skilled in the relevant art will appreciate that actions/steps outlined for routine 600 may be implemented by one or many computing devices/components that are associated with the messaging service provider 106. Accordingly, routine 600 has been logically associated as being generally performed by the messaging service provider 106, and thus the following illustrative embodiments should not be construed as limiting.

At a block 602, the community-level keyword generator component 116 identifies one or more communities of users associated with the first user. In one embodiment, a community associated with the first user can include simply the first user and one other user with whom the first user is having a conversation. In other embodiments, a community associated with the first user may include other members that are associated with the first user based at least in part on social networking connections with the first user. For example, the first user may have a number of identified contacts, or user connections, with whom the first user is connected by a first degree of separation, or first level. A community associated with the first user may also extend further to those users who are connected to the first user's contacts, creating a second level of separation. In yet other embodiments, the community associated with the first user may be determined based in part on profile data of the first user. In still further embodiments, the community associated with the first user may be a pre-established community of which the first user is a member, such as a cycling group.

Continuing at block 604, for each identified community associated with the first user, the community-level keyword generator component 116 retrieves keyword data based on monitored conversations of each member of the respective user community. At block 606, the community-level keyword generator component 116 determines one or more sets of keyword data for presenting to the first user as being associated with the respective one or more identified user communities. Each set of keyword data for a respective particular user community is determined based at least in part on an aggregated analysis of the received keyword data associated with individual members of the particular user community. It will be appreciated by those skilled in the relevant art that other factors may be used to determine each set of community-level keyword data associated with the first user. Then, at block 608, the determined set of keyword data for each identified user community is provided to the first user. In one embodiment, each set of keyword data is provided to the first user in such a way as to cause the first user to be presented with a display in which each keyword in the set of keyword data is selectable to access content associated with the respective keyword. The routine ends at block 610.

Figure 7:
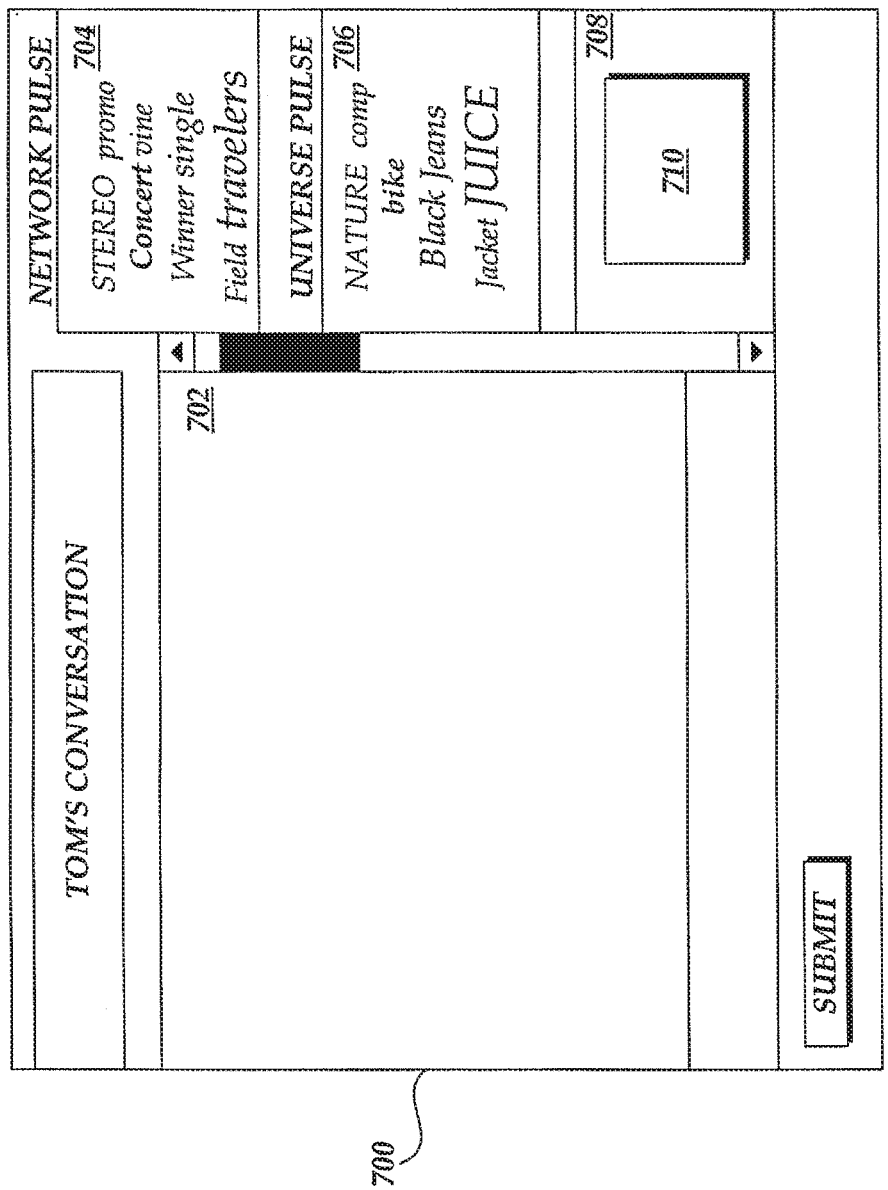
FIG. 7 is an illustrative screen display depicting keywords for various communities presented in an instant messaging communication environment.

With reference now to FIG. 7, one illustrative embodiment of a screen display 700 in which keyword data is provided to a user will now be described. In this illustrative embodiment, the keyword data is determined based on monitored conversations in an instant messaging environment, and the keyword data is provided to a user (in this case Tom) via a display in which the user engages in sending and receiving instant messaging communications. In particular, the screen display 700 includes an instant messaging communication portion 702 in which a communication can be drafted. In addition, the screen display 700 further includes a first community portion 704 in which a first set of keyword data is presented. In this embodiment, the first set of keyword data corresponds to a user community based at least in part on Tom's first level social networking connections. The screen display 700 includes an identifier of this user community (e.g., "My Network Pulse") to enable Tom to identify an association between the first set of keywords and the corresponding user community.

The screen display 700 further includes a second community portion 706 in which a second set of keyword data is presented. In further accordance with this embodiment, the second set of keyword data corresponds to a second user community based at least in part on all levels of Tom's social networking connections, or alternatively based on all users of the messaging service provider 106. The screen display 700 similarly includes an identifier of this second user community (e.g., "My Universe Pulse") to enable Tom to identify an association between the second set of keywords and the corresponding second user community.

In a further embodiment, the keyword data displayed in first and second community portions 704 and 706 of the screen display 700 can include one or more identifiers to indicate the degree of interest of each of the keywords to the associated community. For example, the size of each of the keywords can vary in direct correlation, relative correlation, or inversely to the frequency that the keyword is used by members of the community. In particular, the size of each of the keywords can vary such that the larger the size of a keyword, the more frequent that keyword has been used in conversation by the members of the community. In addition to size or alternatively, other indicators can be used to similarly differentiate keywords, such as color, font, and the like. The indicators can be set by the messaging service provider 106 or by the user. In these embodiments, the messaging service provider 106 causes the user to be presented with such a display in which the keywords are also associated with indicators corresponding to the degree of relevance of each of the keywords to the community.

In a yet further embodiment, a user may select the communities for which he or she would like to receive community-level keyword data and/or customize members of a particular community. For example, a user may desire to regularly receive keyword data for the user's Network Pulse and the user's Universe Pulse as depicted in FIG. 7. As another example, a user may belong to a pre-established community, such as a cycling group, and may select to receive community-level keyword data based on communications of members of that particular community.

Figure 8:
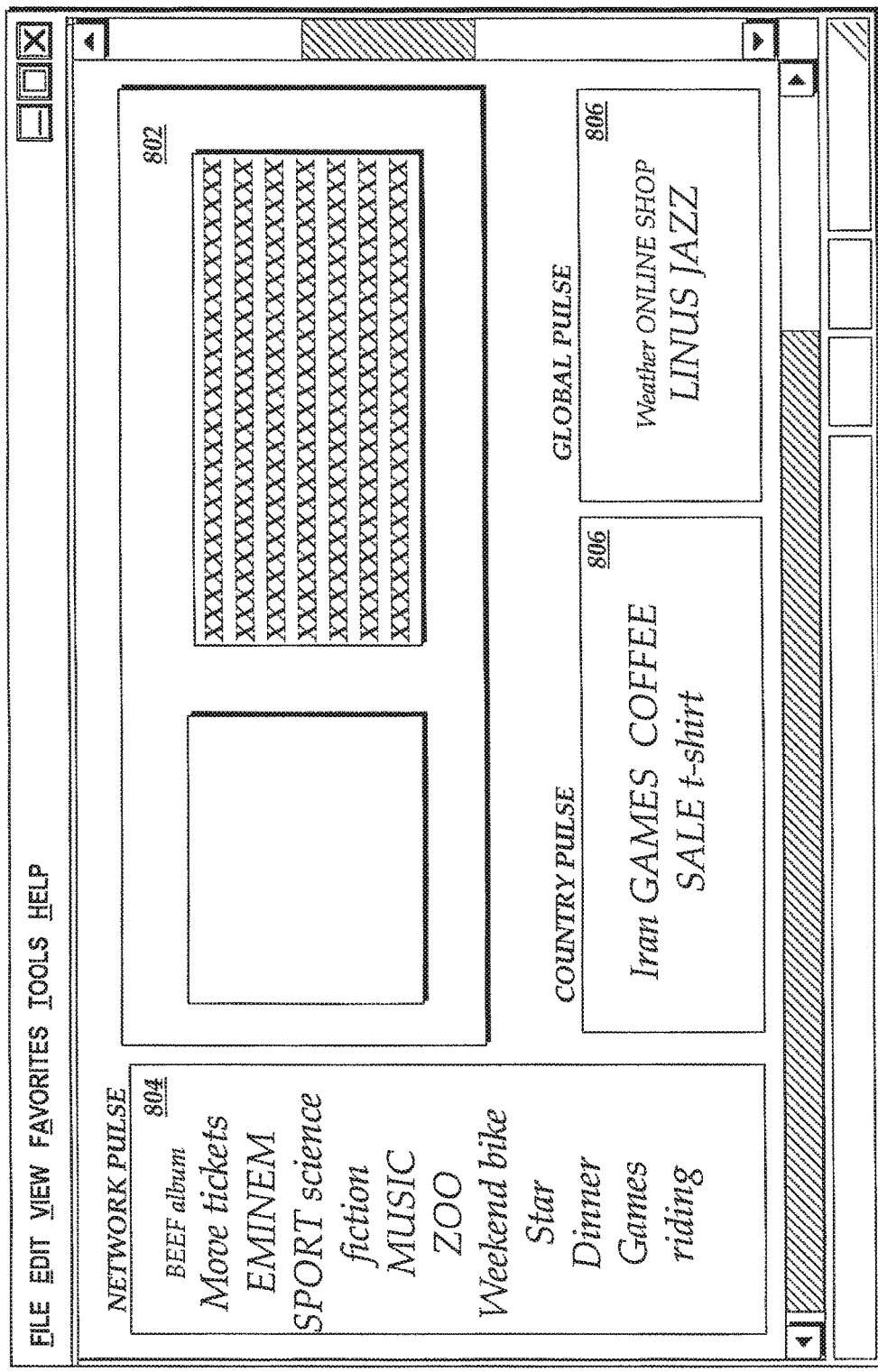
FIG. 8 is another illustrative screen display depicting keywords for various communities presented in a user profile environment.

With reference now to FIG. 8, another illustrative embodiment of a screen display in which community-level keyword data is provided to a user will now be described. In this illustrative embodiment, a screen display 800 is provided as a portion of a user profile. Specifically, the screen display 800 is a Web page corresponding to a user profile of a first user (e.g., Anna). Commonly provided profile data is presented in profile portion 802, while keyword data associated with each of Anna's three user communities is provided in first, second, and third community-level keyword data portions 804, 806, and 808, respectively. As set forth above with respect to FIG. 7, each community-level keyword data portion 804, 806, and 808 includes an identifier of the corresponding user community to enable Anna to identify an association between the keywords and the user community. In addition, in one embodiment, each of the displayed keywords is selectable to provide the user access to content that is associated with the selected keyword.

With reference now to FIG. 9, at a client computing device 102, a user selects a keyword associated with a particular user community (e.g., Anna selects the term "bike" as depicted in Anna's Network Pulse shown in FIG. 8). The selection causes a request for content associated with the selected keyword to be generated and transmitted over network 104 to the keyword-specific page generator interface 108 of the messaging service provider 106. The content can include text, images, data files, data streams, applications, network services, uniform resource locators, or the like. In accordance with an illustrative embodiment, the request for content can be in accordance with common network protocols, such as the hypertext transfer protocol ("HTTP"). Upon receipt of the content request, the keyword-specific page generator interface 108 processes the request and identifies the appropriate responsive content. In one embodiment, the keyword-specific page generator interface 108 in turn requests content associated with the selected keyword from content storage component 120. The requested content is then provided to the keyword-specific page generator interface 108 and is used to generate a keyword-specific Web page. The keyword-specific page generator interface 108 then provides the Web page via processing information, such as hypertext markup language ("HTML"), extensible markup language ("XML"), and the like, to the client computing device 102 over network 104. Upon receipt, the requested content is processed by the browser application on the client computing device 102 as appropriate.

It will be appreciated by one skilled in the relevant art that the content storage component 120 can either provide the requested content if it is available, as described above, or the keyword-specific page generator interface 108 can obtain the requested content or any portion thereof from another source, such as a server computing device or other storage component local to the messaging service provider or distributed over the network 104. For example, the keyword-specific page generator interface 108 can request a portion of content from an advertisement engine or component in order to provide targeted advertisements to the user.

Figure 10:
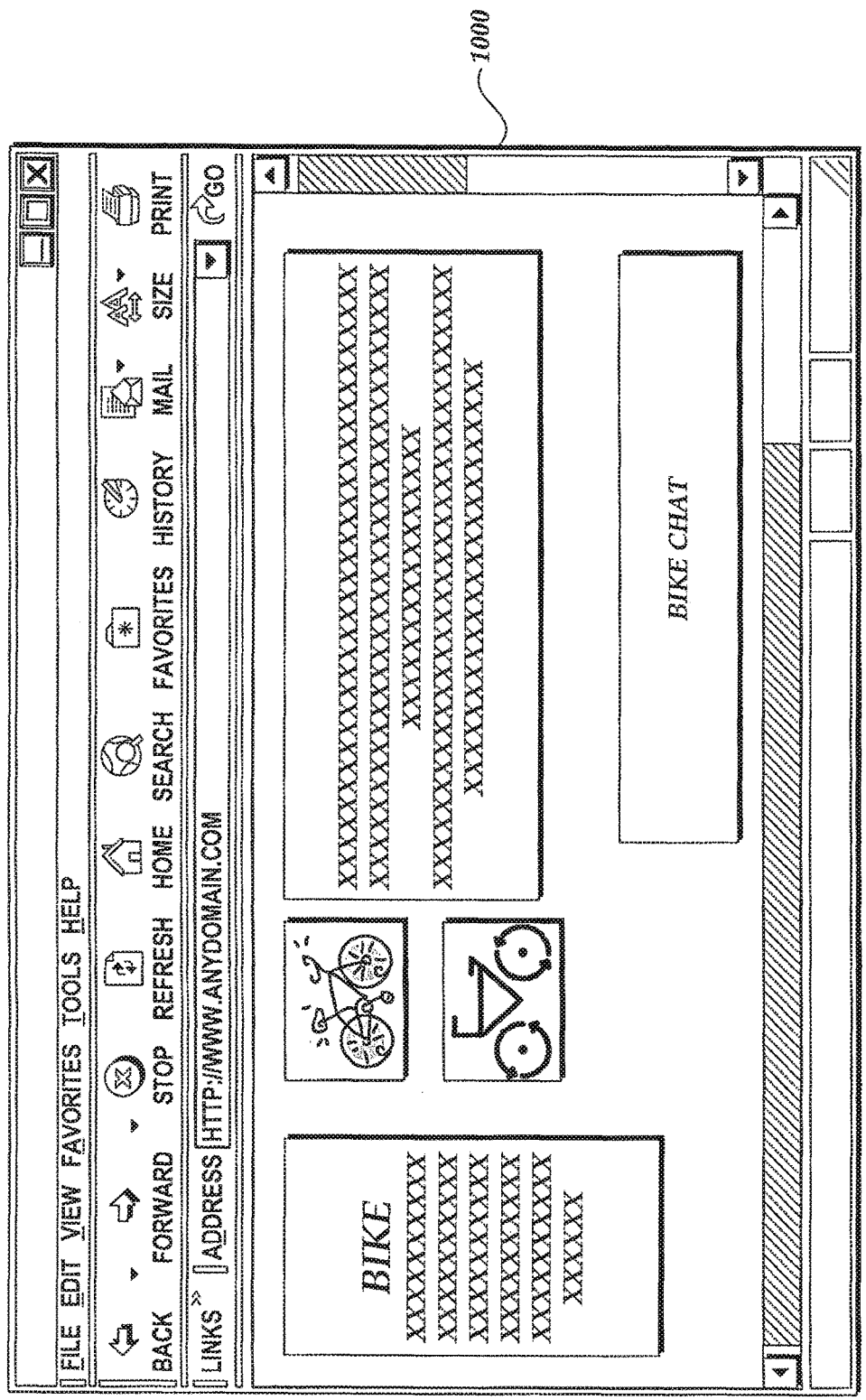
FIG. 10 is an illustrative screen display depicting aggregated content associated with the selection of a keyword.

With reference now to FIG. 10, an illustrative embodiment of a screen display 1000 resulting from a user's selection of a community-level keyword will be described. In this embodiment, the screen display 1000 illustrates a Web page generated from aggregated content associated with the selected keyword. In particular, the screen display 1000 illustrates a Web page which provides a variety of content and types of content related to the selected keyword, in this example a "bike." For example, the content can include a variety of information about bikes, a link to a bike chat, a number of bikers forums, and the like.

It will be appreciated by those skilled in the art and others that while a variety of functions have been described herein as being performed at various interfaces or components of the messaging service provider, these functions can be distributed across one or more computing devices of the messaging service provider. It will further be appreciated by those skilled in the art and others that all of the functions described in this disclosure may be embodied in software executed by one or more processors of the disclosed interfaces or components. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for use in an electronic communications network, the method comprising the following operations using one or more processors:
    identifying a user community associated with a first user, the user community including a plurality of users of the electronic communications network and being based in part on social networking connections of the first user;
    determining a user-community keyword associated with the identified user community, the determining including:
        parsing, via one or more processors, content of at least one electronic communication of the plurality of users of the user community to identify one or more terms used in the electronic communication;
        determining keyword data based on the terms identified in the electronic communications of the user community; and
        determining at least one user-community keyword associated with the user community based on the keyword data of the plurality of users;
        identifying one or more terms that appear more frequently in the electronic communications of the plurality of users of the user-community compared to other user-communities;
        applying a weighting algorithm to the one or more terms that appear more frequently, whereby more weight is applied at least to terms identified in more recent electronic communications between users in the user-community; and
    presenting, via a network, in association with a display of electronic communications between users of the user community, the at least one user-community keyword to the first user, the at least one user-community keyword being selectable by the first user to access content stored in a content storage component that is associated with the user-community keyword.

2. The method of claim 1, wherein determining keyword data includes:
    storing a record of the one or more identified terms in association with the first user.

3. The method of claim 2, wherein determining keyword data includes:
    comparing the terms identified in the electronic communications with data of a news source to identify potentially relevant keyword data.

4. The method of claim 2, further comprising:
    generating a frequency vector associating the one or more terms with a parameter indicative of a frequency of use of the one or more terms.

5. The method of claim 1, wherein determining at least one user-community keyword includes:
    determining a frequency of terms associated collectively with each user of the user community.

6. The method of claim 5, wherein determining at least one user-community keyword further includes:
    applying a weighting algorithm to the determined frequency of terms, whereby more weight is applied at least to terms identified in electronic communications between two members of the user community.

7. The method of claim 5, wherein determining at least one user-community keyword further includes:
    identifying users associated with one another based on user social network profile data and a degree of separation between the users.

8. The method of claim 5, wherein determining at least one user-community keyword further includes:
    identifying one or more terms that distinguish the user community from other user communities.

9. The method of claim 1, further comprising:
    identifying an additional user community associated with the first user, the additional user community including a plurality of users of an electronic communication network and being based in part on social networking connections of the first user; and
    determining a user-community keyword associated with the identified additional user community based on terms identified in electronic communications of the plurality of users of the additional user community.

10. The method of claim 1, wherein the user community includes a plurality of users having a first social networking connection with the first user.

11. The method of claim 1, further comprising:
    presenting a plurality of user-community keywords for display to the first user, the plurality of user-community keywords being displayed with characteristics indicative of a relative relevance to the user community.

12. A computer-implemented system for use in an electronic communications network, the system comprising:
    at least one non-transitory storage medium storing instructions; and
    at least one processor that executes the instructions to perform operations including:

identifying a user community associated with a first user, the user community including a plurality of users of the electronic communications network and being based in part on social networking connections of the first user;

determining a user-community keyword associated with the identified user community, the determining including:

parsing, via one or more processors, content of at least one electronic communication of the plurality of users of the user community to identify one or more terms used in the electronic communication;

determining keyword data based on the terms identified in the electronic communications of the user community; and determining at least one user-community keyword associated with the user community based on the keyword data of the plurality of users;

identifying one or more terms that appear more frequently in the electronic communications of the plurality of users of the user-community compared to other user-communities;

applying a weighting algorithm to the one or more terms that appear more frequently, whereby more weight is applied at least to terms identified in more recent electronic communications between users in the user-community; and presenting, via network, in association with a display of electronic communications between users of the user community, the at least one user-community keyword to the first user, the at least one user-community keyword being selectable by the first user to access content stored in a content storage component that is associated with the user-community keyword.

13. The system of claim 12, wherein the operations performed by the at least one processor for determining keyword data include:

storing a record of the one or more identified terms in association with the first user; and generating a frequency vector associating the one or more terms with a parameter indicative of a frequency of use of the one or more terms.

14. The system of claim 13, wherein the operations performed by the at least one processor for determining keyword data of the plurality of users include:

comparing the terms identified in the electronic communications with data of a news source to identify potentially relevant keyword data.

15. The system of claim 12, wherein the operations performed by the at least one processor for determining at least one user-community keyword include:

determining a frequency of terms associated collectively with each user of the user community.

16. The system of claim 15, wherein the operations performed by the at least one processor for determining at least one user-community keyword further include:

applying a weighting algorithm to the determined frequency of terms, whereby more weight is applied at least to terms identified in electronic communications between two members of the user community.

17. The system of claim 15, wherein the operations performed by the at least one processor for determining at least one user-community keyword further include:

identifying users associated with one another based on user social network profile data and a degree of separation between the users; and identifying one or more terms that distinguish the user community from other user communities.

18. A non-transitory computer-readable storage medium containing instructions, which, when executed by at least one processor, cause the at least one processor to:

identify a user community associated with a first user, the user community including a plurality of users of the electronic communications network and being based in part on social networking connections of the first user;

determine a user-community keyword associated with the identified user community, the determining including:

parse, via one or more processors, content of at least one electronic communication of the plurality of users of the user community to identify one or more terms used in the electronic communication;

determine keyword data based on the terms identified in the electronic communications of the user community; and determine at least one user-community keyword associated with the user community based on the keyword data of the plurality of users;

identify one or more terms that appear more frequently in the electronic communications of the plurality of users of the user community compared to other user-communities;

apply a weighting algorithm to the one or more terms that appear more frequently, whereby more weight is applied at least to terms identified in more recent electronic communications between users in the user-community; and present, via a network, in association with a display of electronic communications between users of the user community, the at least one user-community keyword to the first user, the at least one user-community keyword being selectable by the first user to access content stored in a content storage component that is associated with the user-community keyword.

* * * * *